(12) United States Patent
Kim

(10) Patent No.: US 8,810,926 B2
(45) Date of Patent: Aug. 19, 2014

(54) IMAGING LENS

(75) Inventor: Tae Young Kim, Seoul (KR)

(73) Assignee: Samsung Electro-Mechanics Co., Ltd., Gyunggi-Do (KR)

( * ) Notice: Subject to any disclaimer, the term of this patent is extended or adjusted under 35 U.S.C. 154(b) by 20 days.

(21) Appl. No.: 13/450,096

(22) Filed: Apr. 18, 2012

(65) Prior Publication Data

US 2013/0163100 A1   Jun. 27, 2013

(30) Foreign Application Priority Data

Dec. 26, 2011   (KR) .................. 10-2011-0142662

(51) Int. Cl.
   *G02B 3/02*   (2006.01)
   *G02B 9/34*   (2006.01)

(52) U.S. Cl.
   CPC ........................ *G02B 9/34* (2013.01)
   USPC .......................... 359/715; 359/781

(58) Field of Classification Search
   USPC .................................. 359/715, 781
   See application file for complete search history.

(56) References Cited

U.S. PATENT DOCUMENTS

2011/0122512 A1*   5/2011   Asami .................... 359/753

FOREIGN PATENT DOCUMENTS

| JP | 2010-015004 A | 1/2010 |
| JP | 2010-054646 A | 3/2010 |
| WO | WO 2010035880 A1 * | 4/2010 |

OTHER PUBLICATIONS

Office action dated May 1, 2013 from corresponding Korean Patent Application No. 10-2011-0142662 and its English summary provided by the clients.

* cited by examiner

*Primary Examiner* — William Choi
(74) *Attorney, Agent, or Firm* — Ladas & Parry, LLP

(57) ABSTRACT

Disclosed herein is an imaging lens. The imaging lens according to a preferred embodiment of the present invention includes a first lens having positive (+) power and having both sides formed to be convex, a second lens having negative (−) power and formed to be concave toward a top side, a third lens having positive power and having both sides formed to be convex, a fourth lens having positive (+) power and formed to be convex toward a top side, and a fifth lens having negative (−) power and formed to be concave toward the top side, wherein the first lens, the second lens, the third lens, the fourth lens, and the fifth lens are disposed in order from an object side.

9 Claims, 3 Drawing Sheets

OBJECT SIDE ← → TOP SIDE

IMAGING LENS

CROSS REFERENCE TO RELATED APPLICATION

This application claims the benefit of Korean Patent Application No. 10-2011-0142662, filed on Dec. 26, 2011, entitled "Imaging Lens", which is hereby incorporated by reference in its entirety into this application.

BACKGROUND OF THE INVENTION

1. Technical Field

The present invention relates to an imaging lens.

2. Description of the Related Art

Recently, a use of a camera as an assistance device for ensuring a driver's field of vision has been increasingly expanded in an automotive industry. Meanwhile, various types of cameras have been used to be mounted at various positions on a car.

Further, the camera may be mounted at the front and back of a car according to a use location and may be classified into a visual camera and a sensing camera according to the purpose of use.

Further, a lens of a camera has a telephoto angle of view (50° or less based on a diagonal angle of view) for implementing forward monitoring or image output and has a wide angle (90° or more based on a diagonal angle of view) for implementing backward monitoring or image output.

Recently, with the improved performance and complicated function of the camera, the camera requires additional functions of monitoring and sensing the front and back of the car. Further, with the development of a display, the camera requires a high-resolution lens.

As a result, so as to ensure the high resolution and competitive price, the camera is essentially made of a plastic material. However, plastic material degrades in response to temperature, such that the performance of the camera may correspondingly be degraded at the time of performing the sensing function.

SUMMARY OF THE INVENTION

The present invention has been made in an effort to provide an imaging lens with excellent optical characteristics.

Further, the present invention has been made in an effort to provide an imaging lens configured to include a glass lens and a plastic lens.

According to a preferred embodiment of the present invention, there is provided an imaging lens, including: a first lens having negative (−) power; a second lens having negative (−) power; a third lens having positive (+) power and having both sides formed to be convex; and a fourth lens having positive (+) power and having both sides formed to be convex, wherein the first lens, the second lens, the third lens, and the fourth lens are disposed in order from an object side.

The first lens may be made of glass and the second lens, the third lens, and the fourth lens may be made of plastic.

The imaging lens may further include an iris and the iris is disposed between the third lens and the fourth lens.

When a focal distance of the first lens is f1 and a refractive index of the first lens is n, a conditional Equation of $|f1/(n-1)|<10$ may be satisfied.

When a curvature radius of an object surface of the first lens is R1 and a curvature radius of a top side of the first lens is R2, a conditional Equation of $R1/R2>5$ may be satisfied.

When a synthesized focal distance from the first lens to the third lens is Fa and a focal distance of the fourth lens is Fb, a conditional Equation of $Fa/Fb>4$ may be satisfied.

The first lens may be formed to be convex toward an object side and to be concave toward a top side.

The second lens may be formed to be convex toward the object side and to be concave toward the top side.

The second lens, the third lens, and the fourth lens may each have an aspheric surface configured of at least one surface.

The first lens may be formed in a meniscus shape.

DESCRIPTION OF THE PREFERRED EMBODIMENTS

Figure 1:
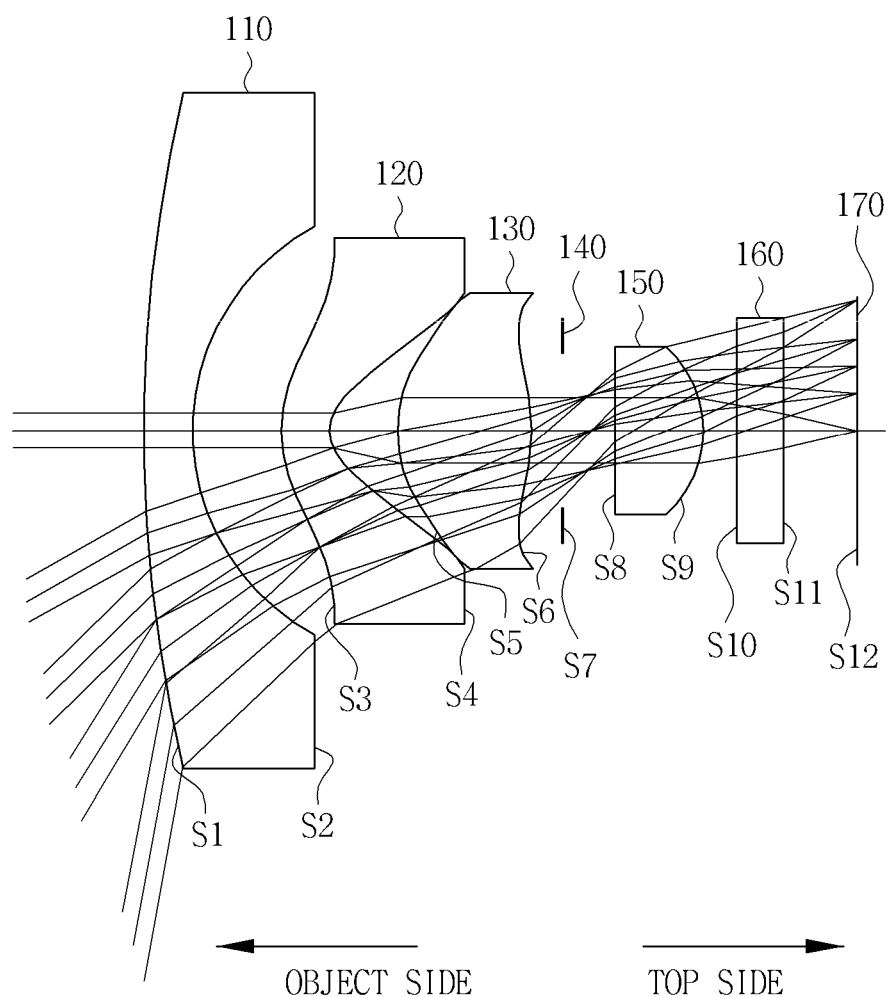
FIG. 1 is a conceptual diagram showing an imaging lens according to a preferred embodiment of the present invention.

Various objects, advantages and features of the invention will become apparent from the following description of embodiments with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. In addition, the present invention may be modified in various different ways and is not limited to the embodiments provided in the present description. Further, in describing the present invention, a detailed description of related known functions or configurations will be omitted so as not to obscure the subject of the present invention.

Hereinafter, preferred embodiments of the present invention will be described in detail with reference to the accompanying drawings.

FIG. 1 is a conceptual diagram showing an imaging lens according to a preferred embodiment of the present invention.

Referring to FIG. 1, an imaging lens 100 according to a preferred embodiment of the present invention is configured to include a first lens 110, a second lens 120, a third lens 130, and a fourth lens 150 that are disposed in order from an object side.

In addition, the imaging lens 100 according to the preferred embodiment of the present invention may further include an iris 140 disposed between the third lens 130 and the fourth lens 150.

Further, in order to acquire an image of an object, light corresponding to image information of an object transmits the first lens 110, the second lens 120, the third lens 130, the iris 140, the fourth lens 150, and a filter 160 in order and is incident to a light receiving device 170.

First, the first lens 110 has negative (−) power and is made of glass. In this case, the first lens 110 is formed to be convex toward an object side and to be concave toward a top side but may be formed in a meniscus shape.

In addition, the second lens 120 has negative (−) power and is made of plastic. In this case, the second lens 120 is formed to be convex toward an object side and to be concave toward a top side.

Further, the third lens 130 has positive (+) power and both sides thereof are formed to be convex. Therefore, the imaging lens can be slimly implemented while having the high resolution. In this case, the third lens 130 is made of plastic.

Further, the fourth lens 150 has positive (+) power and both sides thereof are formed to be convex. In this case, the fourth lens 150 is made of plastic.

In this case, the fourth lens 150 is formed to have inflection points in inner surfaces of the object side and the top side, such that a chief ray angle (CRA) of the fourth lens 150 may be matched with a CRA of the light receiving device, that is, an image sensor. Therefore, a peripheral brightness ratio may be improved and the degradation in marketability may be prevented.

Further, the second lens 120, the third lens 130, and the fourth lens 150 each have an aspheric surface formed of at least one surface.

Further, the iris 140 is disposed between the third lens 130 and the fourth lens 150 and selectively converges light incident from incident light to control a focal distance. Herein, the iris 140 is disposed between the third lens 130 and the fourth lens 150 to facilitate distortion and abbreviation correction.

Meanwhile, the imaging lens 100 according to the preferred embodiment of the present invention may have, for example, a focal distance of 2.8 mm or less and a horizontal angle of view of 130°, but the focal distance and the horizontal angle of view of the imaging lens according to the preferred embodiment of the present invention are not limited thereto.

In addition, the filter 160 may be formed of an infrared cut filter (IR cut filter), but a kind of the filter 160 according to the preferred embodiment of the present invention is not limited thereto.

In this case, the IR cut filter serves to prevent a radiant heat discharged from external light from being transferred to the light receiving device 170.

That is, the IR cut filter has a structure that transmits visible rays and reflects infrared rays to be emitted to the outside.

Further, the light receiving device 170 including a surface on which an image is focused may be configured of an image sensor that converts an optical signal corresponding to a subject image into an electrical signal. In this case, the image sensor may be configured of a charge couple device (CCD) or a complementary metal oxide semiconductor (CMOS) sensor, but the light receiving device according to the preferred embodiment of the present invention is not limited thereto.

The imaging lens 100 according to the preferred embodiment of the present invention has the optical characteristics as in the following Table 1.

TABLE 1

| Lens Surface Number | Curvature Radius (mm) | Thickness (mm) | Refractive Index | Abbe Number | Remarks |
|---|---|---|---|---|---|
| S1 | 27.90000 | 0.910000 | 1.744 | 44.8 | L1 |
| S2 | 4.21000 | 1.475000 | | | |
| S3 | 1.97274 | 0.900000 | 1.536 | 55.7 | L2 |
| S4 | 0.73223 | 1.307000 | | | |
| S5 | 2.52828 | 2.470000 | 1.619 | 26.26 | L3 |
| S6 | −6.26217 | 1.068000 | | | |
| S7 | infinite | 0 | — | — | Stop |
| S8 | 12.87772 | 1.640000 | 1.536 | 55.7 | L4 |
| S9 | −1.64731 | 0.601144 | | | |
| S10 | infinite | 0.850000 | 1.525 | 54.5 | Filter |
| S11 | infinite | 1.338314 | | | |
| S12 | infinite | 0.010545 | — | — | Image Sensor |

As shown in the above Table 1, the second lenses 120 and L2, the third lenses 130 and L3, and the fourth lenses 150 and L4 of the imaging lens 100 according to the preferred embodiment of the present invention each have at least one aspheric surface. Meanwhile, the first lenses 110 and L1 have a spherical surface.

Further, "−" value described in the above Table 1 means a non-defined value.

Further, in the preferred embodiment of the present invention, the above S7 means a surface that determines the amount of light of the imaging lens 100 and Stop described in the Remarks of the above S7 means the aperture iris 140 and S7 used to control the amount of light.

In this case, the iris 140 is disposed between the third lens 130 and the fourth lens 150 but the position of the iris 140 according to the preferred embodiment of the present invention is not necessarily limited thereto.

The following Table 2 is aspheric coefficient values for the aspheric lens according to the preferred embodiment of the present invention.

TABLE 2

| | K | A | B | C | D |
|---|---|---|---|---|---|
| S3 | −0.940884 | −.264927E−01 | 0.143829E−02 | −.509728E−04 | 0.986584E−06 |
| S4 | −1.125297 | −.181781E−01 | −.728154E−03 | −.294635E−04 | 0.117043E−04 |
| S5 | −2.998560 | 0.130787E−01 | 0.214898E−02 | −.790005E−03 | 0.659276E−04 |
| S6 | 1.000000 | 0.106743E−01 | −.168781E−02 | 0.456514E−03 | −.245977E−04 |
| S8 | −.380779E−01 | 0.132749E−01 | −.123300E−01 | 0.405497E−02 | −0.00164 |
| S9 | −1.260545 | −.433703E−02 | −.120150E−02 | −.173584E−02 | 0.269375E−03 |

As described in the above Tables 1 and 2, the above S7, which is the aperture iris 140 and S7 used to control the amount of light, is flat and therefore, does not have the aspheric coefficient values.

In addition, the above S10 and S11 are the filter 160 and the above S12, which is the light receiving device 170, that is, the image sensor, is flat and therefore, does not have the aspheric coefficient values.

In addition, the above S1 and S2 are spherical and do not have the aspheric coefficient values.

Further, the aspheric coefficient values according to the preferred embodiment of the present invention may be obtained from the following Equation 1.

$$Z(h) = \frac{ch^2}{1 + \sqrt{1 - (1+k)c^2h^2}} + Ah^4 + Bh^6 + Ch^8 + Dh^{10} \quad \text{[Equation 1]}$$

Z: a distance from an apex of a lens to an optical-axis direction
C: a basic curvature of a lens
H: a distance to a direction vertical to an optical axis
K: a conic constant
A, B, C, D: an aspheric constant Further, when the overall focal distance of the imaging lens 100 according to the preferred embodiment of the present invention is F and the focal distances of the first lens 110, the second lens 120, the third lens 130, and the fourth lens 150 each are F1, F2, F3, and F4, each value is as the following Table 3.

TABLE 3

| Items | |
|---|---|
| Overall focal distance F of imaging lens | 1.3 |
| Focal distance F1 of first lens | −6.739859 |
| Focal distance F2 of second lens | −2.800730 |
| Focal distance F3 of third lens | 3.181706 |
| Focal distance F4 of fourth lens | 2.847011 |

According to the preferred embodiment of the present invention, when the focal distance of the first lens 110 is f1 and the refractive index of the first lens 110 is n, the following conditional equation may be satisfied.

$$|f1/(n-1)| < 10 \quad (1)$$

The above conditional Equation (1) represents characteristics for the refractive index of the first lens 110. When the first lens 110 is designed to have a value larger than the conditional Equation (1), the balance for the overall power is poor and thus, the performance degradation of the peripheral devices is worsened.

Therefore, when the conditional Equation 1 is satisfied, the balance for power is good and as a result, the degradation level is good.

Figure 2:
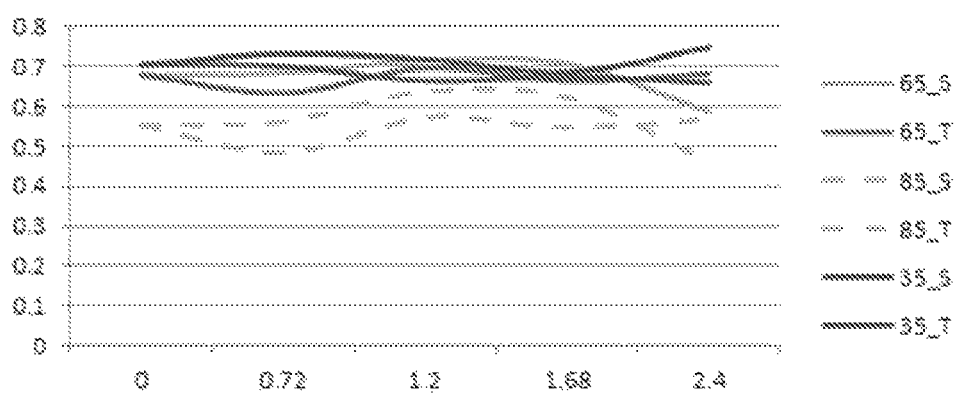
FIG. 2 is a graph showing focus variations measured for each temperature of the imaging lens according to the preferred embodiment of the present invention.
Figure 3:
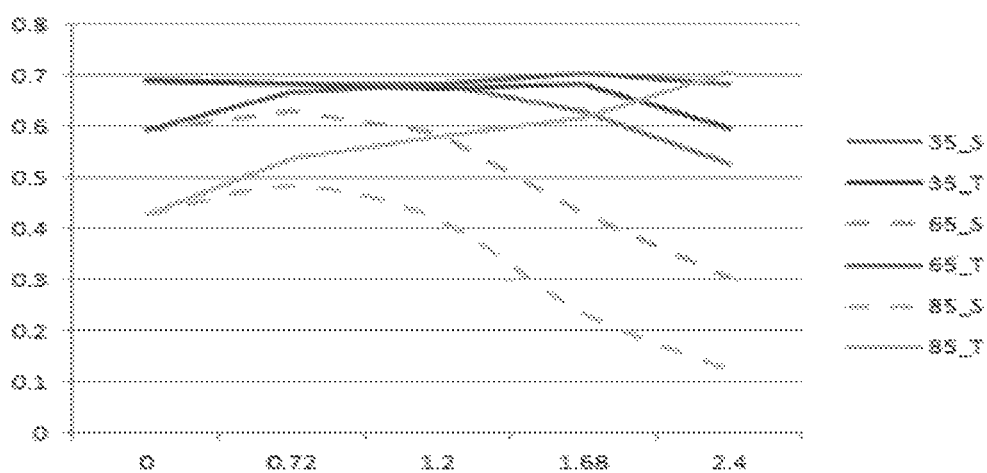
FIG. 3 is a graph showing focus variations for each temperature measured in a range beyond a conditional equation of the imaging lens according to the preferred embodiment of the present invention.

FIG. 2 is a graph showing focus variations measured for each temperature of the imaging lens according to the preferred embodiment of the present invention and FIG. 3 is a graph showing focus variations for each temperature measured in a range beyond a conditional equation of the imaging lens according to the preferred embodiment of the present invention.

In this case, FIG. 2 shows focus variations for each temperature of the imaging lens 100 that is measured in a range satisfying the conditional Equation 1. From the case in which the focus graphs for each temperature are shown to be adjacent to each other, it can be appreciated that the focus variations for each temperature are not large.

However, FIG. 3 shows the focus variations for each temperature of the imaging lens 100 measured beyond the above conditional Equation (1). From the case in which the focus graphs for each temperature are shown to be largely spaced from each other without being adjacent to each other, it can be appreciated that the focus variations for each temperature are large.

According to the preferred embodiment of the present invention, when a curvature radius of the object surface of the first lens 110 is R1 and a curvature radius of the top side of the first lens 110 is R2, the following conditional equation may be satisfied.

$$R1/R2 > 5 \quad (2)$$

The above conditional Equation (2) shows characteristics for the curvature radius of the first lens 110 according to the preferred embodiment of the present invention. When the first lens 110 is designed to have a value smaller than the conditional Equation (2), the size of the lens may be reduced but the sensitivity is increased and thus, the reduction in the peripheral brightness ratio and the peripheral sensitivity is increased.

As a result, the manufacturing performance is poor and the performance degradation in the peripheral devices is worsened when the peripheral temperature is changed.

Further, a difference in the optical paths between an outermost ray and a central ray occurs and thus, the performance degradation in the peripheral devices is worsened.

Figure 4:
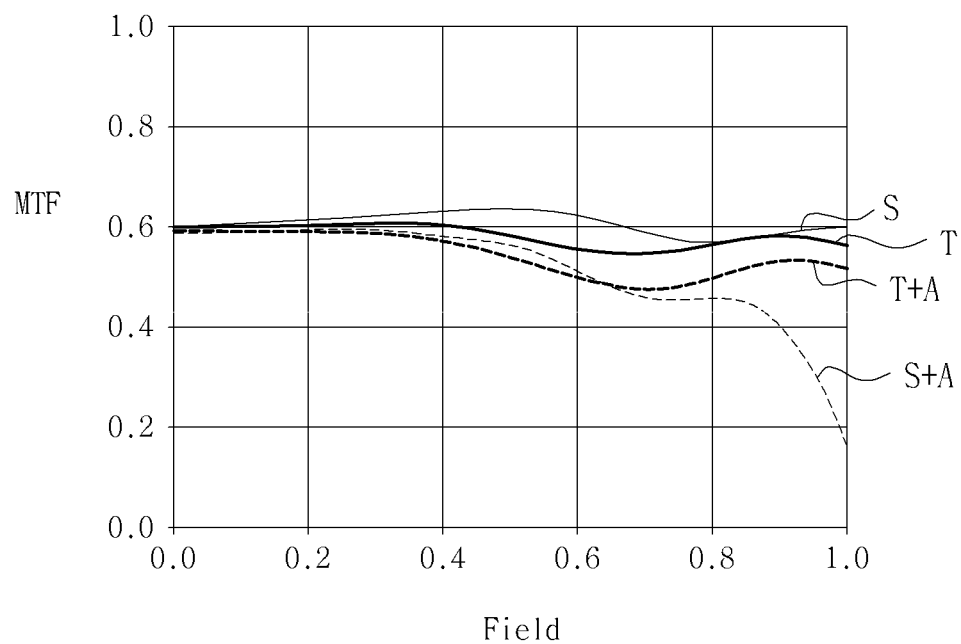
FIG. 4 is a graph showing an MTF of the imaging lens according to the preferred embodiment of the present invention.

Further, FIG. 4 is a graph showing an MTF of the imaging lens 100 according to the preferred embodiment of the present invention.

Further, FIG. 4 shows a case in which a tangential (T) graph and a sagittal (S) graph measured in the range in which the conditional Equation 2 is satisfied are adjacent to each other. Thereby, it can be appreciated that the difference in the optical paths is small and thus, the performance degradation in the peripheral devices is small.

Meanwhile, it can be appreciated from FIG. 4 that a tangential (T+A) graph and a sagittal (S+A) graph measured beyond the conditional Equation (2) are shown to be greatly spaced from each other. Thereby, it can be appreciated that the difference in the optical paths is great and thus, the performance degradation in the peripheral devices is large.

According to the preferred embodiment of the present invention, when a synthesized focal distance from the first lens 110 to the third lens 130 is Fa and a focal distance of the fourth lens 150 is Fb, the following conditional Equation may be satisfied.

$$Fa/Fb > 4 \quad (3)$$

The above conditional Equation (3) shows characteristics for the focal distance of the imaging lens 100 according to the preferred embodiment of the present invention. When the focal distance of the imaging lens 100 is designed to have a value larger than the conditional Equation (3), the depth of focus is not maximized.

Figure 5:
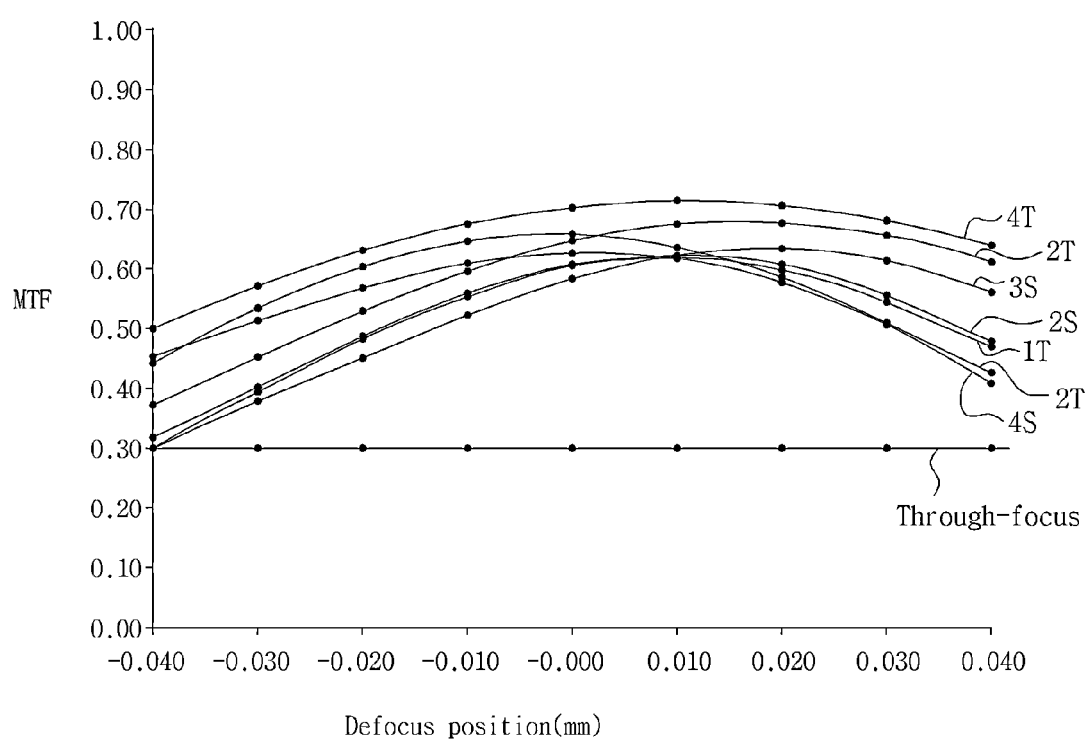
FIG. 5 is a graph showing a depth of focus of the imaging lens according to the preferred embodiment of the present invention.

FIG. 5 is a graph showing the depth of focus of the imaging lens according to the preferred embodiment of the present invention. Here, FIG. 5 is a graph shown the depth of focus of the imaging lens 100 measured in the range in which the conditional Equation (3) is satisfied. It can be appreciated that the graphs shown in FIG. 5 are positioned to be adjacent to each other. Thereby, it can be appreciated that the depth of focus is maximized and the temperature compensation is easily performed.

The preferred embodiments of the present invention can improve the sensitivity and degradation level due to the excellent optical characteristics. In addition, the preferred embodiments of the present invention can improve the peripheral resolution and the temperature compensation.

Further, the preferred embodiments of the present invention can reduce the manufacturing costs by allowing the camera to include the glass lens and the plastic lens.

Although the preferred embodiments of the present invention have been disclosed for illustrative purposes, they are for specifically explaining the present invention and thus an imaging lens according to the present invention is not limited thereto, but those skilled in the art will appreciate that various modifications, additions and substitutions are possible, without departing from the scope and spirit of the invention as disclosed in the accompanying claims.

In addition, any and all modifications, variations or equivalent arrangements should be considered to be within the scope of the invention, and the detailed scope of the invention will be disclosed by the accompanying claims.

What is claimed is:

1. An imaging lens, comprising:
a first lens having negative (−) power;
a second lens having negative (−) power;
a third lens having positive (+) power and having both sides formed to be convex;
a fourth lens having positive (+) power and having both sides formed to be convex; and
an iris disposed between the third lens and the fourth lens,
wherein the first lens, the second lens, the third lens, and the fourth lens are disposed in order from an object side, and
wherein the fourth lens is formed to have inflection points in inner surfaces of the object side and a top side.

2. The imaging lens as set forth in claim 1, wherein the first lens is made of glass and the second lens, the third lens, and the fourth lens are made of plastic.

3. The imaging lens as set forth in claim 1, wherein when a focal distance of the first lens is f1 and a refractive index of the first lens is n, a conditional Equation of $|f1/(n-1)|<10$ is satisfied.

4. The imaging lens as set forth in claim 1, wherein the first lens is formed to be convex toward an object side and to be concave toward a top side.

5. The imaging lens as set forth in claim 1, wherein the second lens is formed to be convex toward the object side and to be concave toward the top side.

6. The imaging lens as set forth in claim 1, wherein the first lens is formed in a meniscus shape.

7. An imaging lens, comprising:
a first lens having negative (−) power;
a second lens having negative (−) power;
a third lens having positive (+) power and having both sides formed to be convex; and
a fourth lens having positive (+) power and having both sides formed to be convex,
wherein the first lens, the second lens, the third lens, and the fourth lens are disposed in order from an object side,
wherein the fourth lens is formed to have inflection points in inner surfaces of the object side and a top side, and
wherein when a curvature radius of an object surface of the first lens is R1 and a curvature radius of a top side of the first lens is R2, a conditional Equation of $R1/R2>5$ is satisfied.

8. An imaging lens, comprising:
a first lens having negative (−) power;
a second lens having negative (−) power;
a third lens having positive (+) power and having both sides formed to be convex; and
a fourth lens having positive (+) power and having both sides formed to be convex,
wherein the first lens, the second lens, the third lens, and the fourth lens are disposed in order from an object side,
wherein the fourth lens is formed to have inflection points in inner surfaces of the object side and a top side, and
wherein when a synthesized focal distance from the first lens to the third lens is Fa and a focal distance of the fourth lens is Fb, a conditional Equation of $Fa/Fb>4$ is satisfied.

9. An imaging lens, comprising:
a first lens having negative (−) power;
a second lens having negative (−) power;
a third lens having positive (+) power and having both sides formed to be convex; and
a fourth lens having positive (+) power and having both sides formed to be convex,
wherein the first lens, the second lens, the third lens, and the fourth lens are disposed in order from an object side,
wherein the fourth lens is formed to have inflection points in inner surfaces of the object side and a top side, and
wherein the second lens, the third lens, and the fourth lens each have an aspheric surface configured of at least one surface.

* * * * *